(12) United States Patent  
Greenwood

(10) Patent No.: US 8,870,510 B2  
(45) Date of Patent: Oct. 28, 2014

(54) WIRE MESH RIVET

(75) Inventor: George Greenwood, Tiverton, RI (US)

(73) Assignee: ACS Industries, Inc., Lincoln, RI (US)

( * ) Notice: Subject to any disclaimer, the term of this patent is extended or adjusted under 35 U.S.C. 154(b) by 196 days.

(21) Appl. No.: 13/130,605

(22) PCT Filed: Nov. 19, 2009

(86) PCT No.: PCT/US2009/065161  
§ 371 (c)(1),  
(2), (4) Date: May 23, 2011

(87) PCT Pub. No.: WO2010/062828  
PCT Pub. Date: Jun. 3, 2010

(65) Prior Publication Data  
US 2011/0220676 A1    Sep. 15, 2011

Related U.S. Application Data

(60) Provisional application No. 61/118,506, filed on Nov. 28, 2008.

(51) Int. Cl.  
*F16B 19/08* (2006.01)  
*B21K 1/58* (2006.01)  
(Continued)

(52) U.S. Cl.  
CPC ............... *F16B 19/08* (2013.01); *F16B 19/02* (2013.01); *B21F 33/00* (2013.01); *B21F 45/16* (2013.01); *B21J 15/00* (2013.01); *B21J 15/323* (2013.01); *F01N 13/14* (2013.01); *F01N 13/18* (2013.01); *B21J 15/046* (2013.01); *B21J 15/28* (2013.01); *F16F 1/362* (2013.01); *G10K 11/162* (2013.01); *G10K 11/168* (2013.01); *F01N 2260/20* (2013.01)  
USPC ............................ 411/501; 411/443; 206/347

(58) Field of Classification Search  
USPC ............. 411/442, 443, 501, 546, 901; 16/2.1, 16/2.2; 206/346, 347  
See application file for complete search history.

(56) References Cited

U.S. PATENT DOCUMENTS 2,680,284 A    6/1954  Markowski et al.  
2,869,858 A *  1/1959  Hartwell ..................... 267/147  
(Continued)

FOREIGN PATENT DOCUMENTS

EP    0 384 087 A1    8/1990  
EP    0 519 636 A1    12/1992  
(Continued)

OTHER PUBLICATIONS

Professional English Translation of JP 57-032234.

*Primary Examiner* — Flemming Saether  
(74) *Attorney, Agent, or Firm* — Maurice M. Klee

(57) ABSTRACT

A wire mesh rivet (13) is provided which is used to produce a wire mesh isolator (11) in a bore (9) of a substrate such as a heat shield (7) for a vehicle exhaust system. The rivet (13) comprises a unitary wire mesh structure (19) which has a collar (15) and a shank (17). The collar (15) has a higher density than the shank (17), e.g., the collar (15) has the density of the finished isolator (11). The rivet (13) is formed into the finished isolator (11) by compressing the shank (17) to form a second collar, while restraining the original collar (15) from substantially changing its shape. The rivet (13) can include a metal insert (23) which prevents the wire mesh of the finished isolator (11) from experiencing high levels of compression when the substrate is fastened to its supporting structure. The rivets (13) can be carried by a dispensing strip (31) and can be formed into the finished isolator (11) using forming equipment (39) whose dimensions are compatible with the limited space available with some substrates.

10 Claims, 13 Drawing Sheets

(51) Int. Cl.
    *B21F 33/00*      (2006.01)
    *B21F 45/16*      (2006.01)
    *B21J 15/00*      (2006.01)
    *B21J 15/32*      (2006.01)
    *B21J 15/04*      (2006.01)
    *B21J 15/28*      (2006.01)
    *F16F 1/362*      (2006.01)
    *G10K 11/162*     (2006.01)
    *F16B 19/02*      (2006.01)
    *F01N 13/14*      (2010.01)
    *F01N 13/18*      (2010.01)
    *G10K 11/168*     (2006.01)

(56)　　　　References Cited

U.S. PATENT DOCUMENTS

| | | | |
|---|---|---|---|
| 3,097,360 A * | 7/1963 | Carlson, Jr. et al. | 206/346 |
| 3,223,374 A | 12/1965 | Butler et al. | |
| 3,593,399 A | 7/1971 | Bannister | |
| 3,766,631 A | 10/1973 | Scheitlin et al. | |
| 3,895,408 A * | 7/1975 | Leingang | 16/2.1 |
| 3,938,657 A * | 2/1976 | David | 206/343 |
| 4,003,288 A | 1/1977 | Jeal | |
| 4,637,765 A | 1/1987 | Omata | |
| 4,748,806 A * | 6/1988 | Drobny | 60/800 |
| 4,865,792 A | 9/1989 | Moyer | |
| 4,953,420 A | 9/1990 | Krubsack et al. | |
| 5,035,041 A | 7/1991 | Matuschek | |
| 5,452,796 A * | 9/1995 | Ohuchi | 206/347 |
| 6,328,513 B1 * | 12/2001 | Niwa et al. | 411/339 |
| 2005/0040576 A1 | 2/2005 | Oxenknecht et al. | |
| 2005/0258613 A1 | 11/2005 | Kleckner | |
| 2006/0219860 A1 | 10/2006 | Greenwood | |

FOREIGN PATENT DOCUMENTS

| | | |
|---|---|---|
| JP | 57-32234 | 2/1982 |
| JP | 59-107638 | 6/1984 |
| JP | 61-023511 | 2/1986 |
| JP | 2004-116442 | 4/2004 |
| JP | 2006-153055 | 6/2006 |
| JP | 2008-536067 | 9/2008 |
| WO | WO 2005/019714 | 3/2005 |

* cited by examiner

WIRE MESH RIVET

CROSS-REFERENCE TO RELATED APPLICATION

This application claims the benefit under 35 USC §119(e) of U.S. Provisional Application No. 61/118,506 filed on Nov. 28, 2008, the contents of which in its entirety is hereby incorporated by reference.

FIELD

This invention relates to wire mesh isolators for use in providing thermal and/or acoustical isolation for, among other things, the heat shields employed in vehicle exhaust systems.

BACKGROUND

Commonly-assigned U.S. Patent Publication No. 2006/0219860, the contents of which are incorporated herein by reference, discloses unitary wire mesh isolators which are formed by inserting a wire mesh sleeve through a bore in a substrate, e.g., through a bore in a heat shield for a vehicle exhaust system, and then compressing the portions of the sleeve that extend on either side of the substrate into collars larger than the bore so as to trap the wire mesh in place at the bore and form the desired isolator. As detailed in the '860 application, the resulting unitary isolator solves a variety of problems associated with multi-piece isolators, including difficulties arising from assembling multiple components in a manufacturing setting and the problem of separation of the isolator's components during shipping of assembled heat shields to vehicle manufacturers and/or during use of the heat shields.

Because the collars on both sides of the substrate are formed simultaneously in the '860 application, similar forming equipment is needed on each side of the substrate. For many applications, the use of such equipment is entirely acceptable. However, for some applications, only a limited amount of space is available on one side of the substrate. In particular, heat shields often have a concave and a convex side, with the concave side having a limited volume, especially in the region of the bores where the isolators are located.

FIG. 1 shows representative examples of heat shields 7 for vehicle applications, where the bores through the heat shields are shown by the reference number 9. In this figure, isolators 11 have been installed in some of the bores. As is evident from FIG. 1, the volume available for installing an isolator is limited for various of the bore locations. This is especially so for the undersides (concave sides) of bores located near the top of raised sections of a shield. Forming a wire mesh collar in such a limited volume using equipment of the type disclosed in the '860 application can be challenging.

The present invention, in accordance with certain of its aspects, addresses this problem of forming a wire mesh isolator under conditions where the space available for producing the isolator's collar is limited. Both in connection with these aspects and with other aspects, the invention's methods and apparatus seek to simplify the installation of isolators in substrates, as well as to reduce the costs associated therewith.

SUMMARY

In accordance with a first aspect, the invention provides a rivet (13) comprising a unitary wire mesh structure (19) which has a central bore (21) and comprises a collar (15) and a shank (17), wherein the average density of the collar (15) is greater than the average density of the shank (17), e.g., the average density is approximately 20% for the collar (15) and approximately 10% for the shank (17).

In accordance with a second aspect, the invention provides a rivet (13) comprising:
 (a) a unitary wire mesh structure (19) which has a central bore (21) and comprises a collar (15) and a shank (17); and
 (b) a metal insert (23) at least a part of which is within the central bore (21);
wherein the metal insert (23) comprises a wall which has an exterior surface and the exterior surface comprises at least two apertures (27) for engaging the wire mesh of the central bore (21) of the unitary wire mesh structure (19).

In accordance with a third aspect, the invention provides a rivet dispenser comprising a flexible strip (31) having a plurality of apertures (33) and at least one wire mesh rivet (13) in one of the apertures (33), said wire mesh rivet (13) comprising a collar (15) and a shank (17), said apertures (33) being sized to retain the shank (17) and to allow the collar (15) to be pushed through the aperture (33), each aperture (33) comprising a plurality of circumferemial flexible fingers (35) formed by slits (37) in the flexible strip (31), wherein:
 (a) the number of flexible fingers (35) per aperture (33) is between 3 and 16; and
 (b) the length-to-width ratio of each flexible finger (35) is in the range of 1:1 to 3:1, e.g., 1.6:1.

In accordance with a fourth aspect, the invention provides apparatus for forming a wire mesh isolator (11) comprising:
 (a) a sleeve (55) which forms a cavity in which wire mesh is compressed, said sleeve (55) having a substrate engaging position; and
 (b) a sensor (57) for determining when the sleeve (55) is in the substrate engaging position;
wherein:
 (i) the apparatus prevents compression of the wire mesh prior to the sensor (57) signalling that the sleeve (55) is in its substrate engaging position; and
 (ii) the force applied to the substrate (7,65) by the sleeve (55) when the sleeve (55) is in its substrate engaging position is less than 10 pounds.

In accordance with a fifth aspect, the invention provides apparatus comprising a sleeve (47) and a wire mesh rivet (13) said wire mesh rivet (13) comprising a collar (15) whose outside diameter is $OD_{collar}$, said sleeve (47) comprising a recess (49) for receiving the collar (15), said sleeve (47) having an outer surface whose maximum diameter at the location of the recess is $OD_{sleeve}$, wherein $OD_{collar}$ and $OD_{sleeve}$ satisfy the relationship:

$$OD_{sleeve}/OD_{collar} \leq 1.1.$$

In accordance with a sixth aspect, the invention provides a method for making a wire mesh rivet (13) having a collar (15) and a shank (17), said method comprising:
 (a) providing a wire mesh tube (73) having a central bore;
 (b) supporting the tube (73) by:
  (i) inserting a first portion of the tube (73) into a first cavity (81), said first cavity (81) having a fixed bottom (77) and a moveable wall, e.g. a spring-loaded wall (79); and
  (ii) inserting an arbor (71) into the tube's bore;
 (c) surrounding a second portion of the tube (73) with a second cavity (83);
 (d) reducing the volume of the second cavity (83) to form the rivet's collar (15) by compressing the second portion of the tube (73) while not substantially reducing the volume of the first cavity (81); and (e) reducing the volume of the first cavity (81) through movement of the moveable wall (79) relative to the fixed bottom (77) to form the rivet's shank (17) by compressing the first portion of the tube (73);

wherein the second portion of the tube (73) is compressed to a greater extent than the first portion of the tube (73) so that the density of the collar (15) is greater than the density of the shank (17).

The reference numbers used in the above summaries of the various aspects of the invention are only for the convenience of the reader and are not intended to and should not be interpreted as limiting the scope of the invention. More generally, it is to be understood that both the foregoing general description and the following detailed description are merely exemplary of the invention and are intended to provide an overview or framework for understanding the nature and character of the invention.

Additional features and advantages of the invention are set forth in the detailed description which follows and, in part, will be readily apparent to those skilled in the art from that description or recognized by practicing the invention as described herein. The accompanying drawings are included to provide a further understanding of the invention, and are incorporated in and constitute a part of this specification. It is to be understood that the various features of the invention disclosed in this specification and in the drawings can be used in any and all combinations.

BRIEF DESCRIPTION OF THE DRAWINGS

FIG. 19B is a cross-sectional view showing the configuration of the wire mesh tube at this point in the process.

Figure 1:
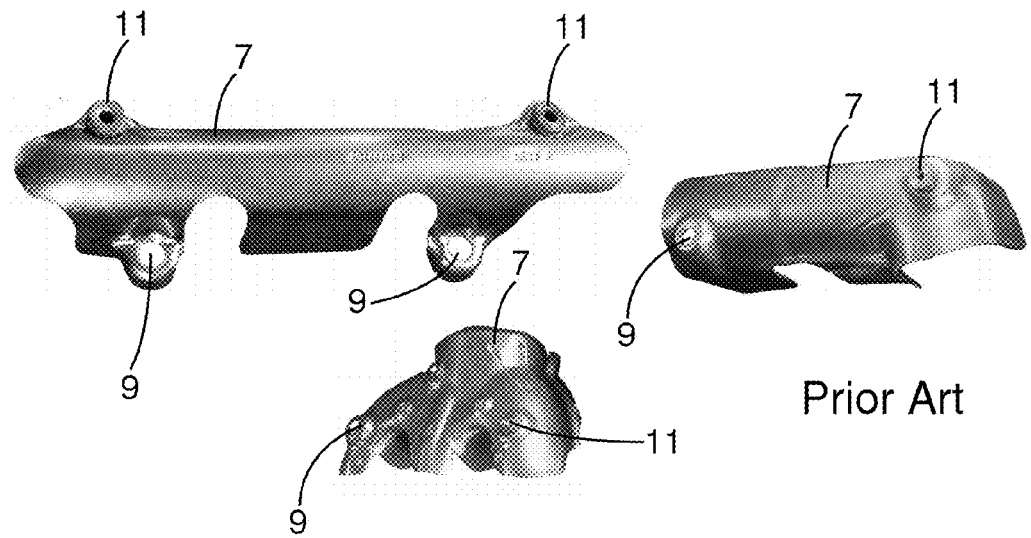
FIG. 1 is a perspective view of representative heat shields with which wire mesh isolators are used.

The reference numbers used in the drawings refer to the following:
  7 heat shield
  9 bore in substrate (e.g., heat shield)
  11 assembled wire mesh isolator
  13 wire mesh rivet
  15 collar of wire mesh rivet
  17 shank of wire mesh rivet
  19 unitary wire mesh structure of wire mesh rivet
  21 bore of unitary wire mesh structure
  23 metal insert
  24 metal insert collar
  25 barb on metal insert
  27a aperture which extends through entire thickness of wall of metal insert
  27b aperture which extends partially through thickness of wall of metal insert
  29 wire mesh in aperture of wall of metal insert
  31 dispensing strip
  33 apertures in dispensing strip
  35 flexible fingers of dispensing strip
  37 slits of dispensing strip
  38 feed notches of dispensing strip
  39 isolator forming equipment
  41 forming assembly of isolator forming equipment
  43 positioning assembly of isolator forming equipment
  45 mandrel of positioning assembly 47 sleeve of positioning assembly
49 recess of sleeve of positioning assembly
51 mandrel of forming assembly
53 tamp of forming assembly
55 sleeve of forming assembly
56 cavity formed by inner wall of sleeve of forming assembly
57 sensor of forming assembly
59 wires for sensor
61 supporting structure for isolator forming equipment
63 second collar of wire mesh isolator
65 substrate
67 fastener
69 exhaust system component
70 rivet forming tool
71 arbor of rivet forming tool
73 rolled mesh tube
75 upper forming sleeve of rivet forming tool
77 stationary member of rivet forming tool
79 spring-loaded sleeve of rivet forming tool
81 first cavity of rivet forming tool
83 second cavity of rivet forming tool

DETAILED DESCRIPTION OF THE PREFERRED EMBODIMENTS

Figure 2:
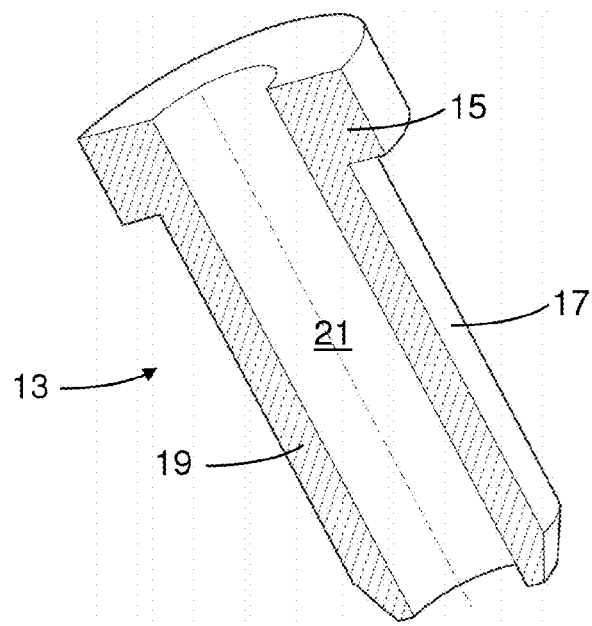
FIG. 2 is a perspective, cross-sectional view of a wire mesh rivet constructed in accordance with certain aspects of the invention.

As discussed above, in connection with certain of its aspects, the invention provides wire mesh rivets for use in forming wire mesh isolators. FIG. 2 shows a representative configuration for such a rivet. As shown in this figure, the rivet comprises a unitary wire mesh structure 19 which (a) has a bore 21 and (b) comprises a collar 15 and a shank 17. The unitary wire mesh structure is preferably formed from a continuous piece of wire mesh, although multiple pieces can be united to form the unitary structure if desired.

Figure 16A:
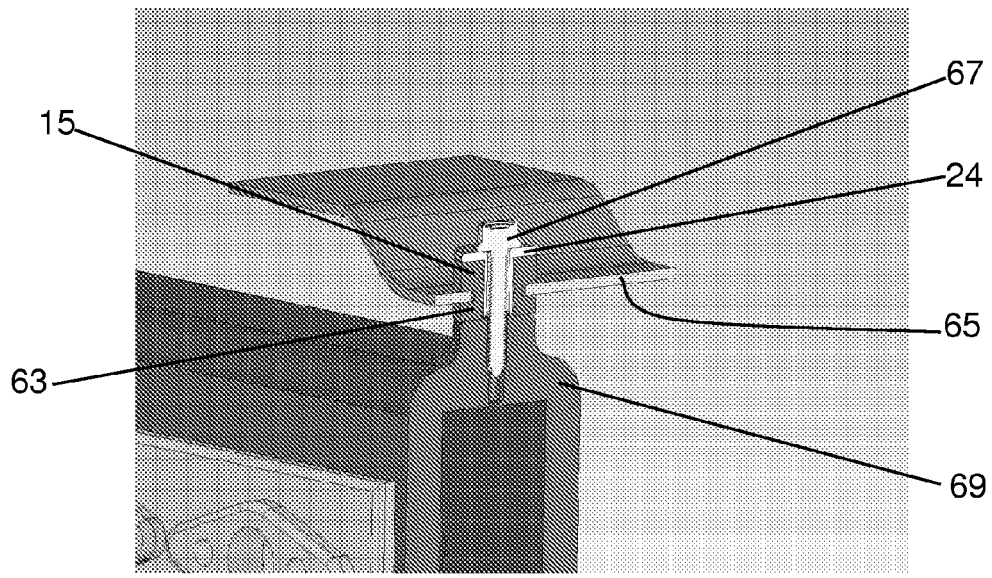
FIGS. 16A and 16B are perspective cross-sectional views of examples of wire mesh isolators produced from wire mesh rivets.
Figure 16B:
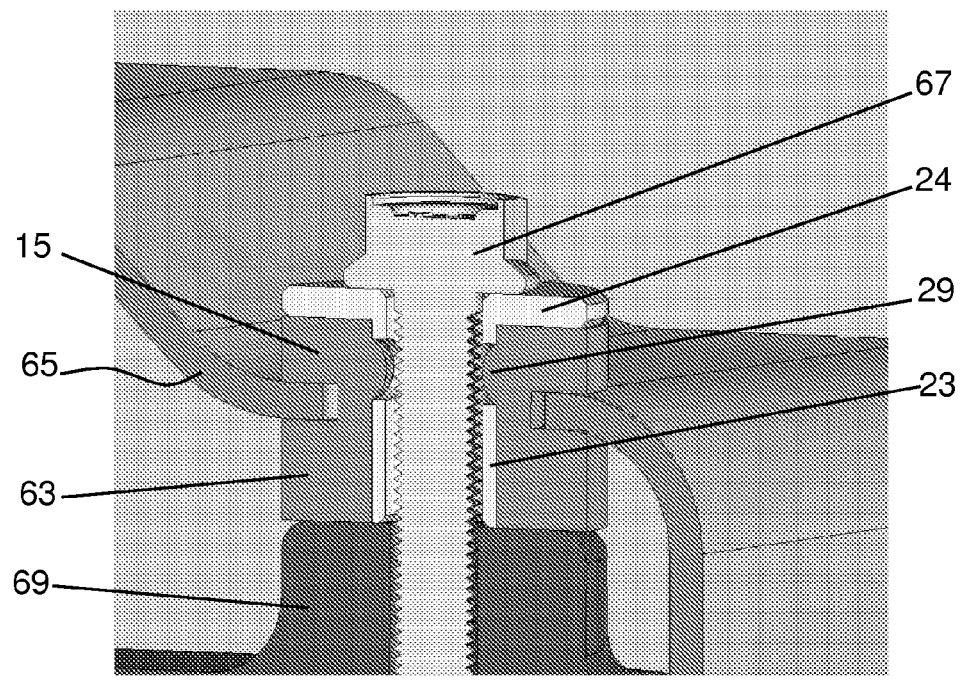

As shown in, for example, FIGS. 3-7, mesh rivet 13 preferably includes a metal insert 23 which extends partially along central bore 21. Metal insert 23 may be in the form of a grommet which has a collar which engages the collar of the unitary wire mesh structure (see FIGS. 3, 4, 6, and 7) or a simple sleeve without a collar (see FIG. 5). In either case, the primary function of the metal insert is to prevent the wire mesh from being excessively compressed when a heat shield is installed in a vehicle. As shown in FIG. 16, such installation involves the insertion of a fastener 67 through the bore of the assembled isolator and the tightening of the fastener to a component of the vehicle, e.g., to a component of the vehicle's exhaust system. To ensure that the heat shield does not become loose during use, substantial torque is typically applied to the fastener. Accordingly, the wall of the metal insert needs to have sufficient column strength to withstand the resulting compressive forces.

Figure 3:
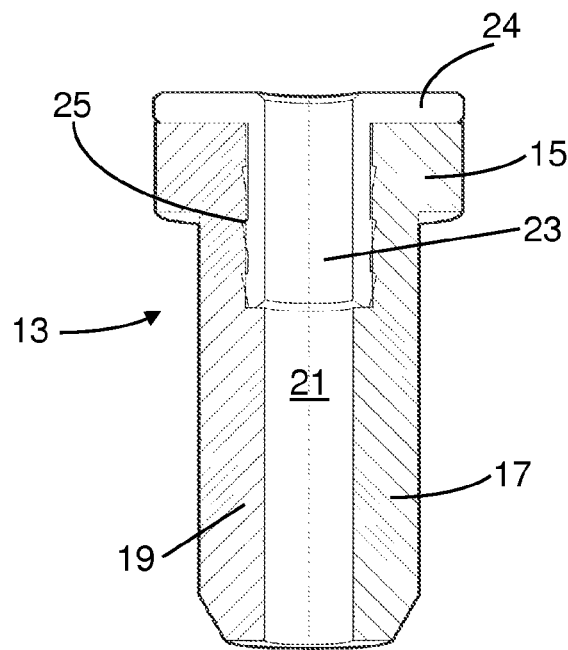
FIG. 3 is a cross-sectional view of a wire mesh rivet wherein the rivet includes a metal insert in the form of a grommet and the grommet includes barbs which engage the rivet's wire mesh structure.

Although the metal insert can simply be placed within the bore of the unitary mesh structure, preferably, the metal insert engages the mesh structure so as to minimize chances that the insert will separate from the mesh structure during shipment and handling of the rivet and/or the assembled isolator prior to final installation of the heat shield. FIG. 3 shows the use of barbs 25 on the outside surface of the metal insert for this purpose. Although the barb approach works satisfactorily, it is relatively expensive since a substantial amount of metal (e.g., on the order of 80%) needs to be removed from the part to form the barbs.

FIGS. 4-7 shows an alternate approach for retaining a metal insert in the unitary mesh structure that is substantially less expensive in terms of material costs than the barb approach of FIG. 3. In accordance with this approach, at least two apertures 27 are formed in the outer surface of the wall of the metal insert. During manufacture of the rivet (see below), wire mesh enters into the apertures (see, for example, reference number 29 in FIG. 6) and thus substantially locks the insert and the sleeve together.

Figure 4:
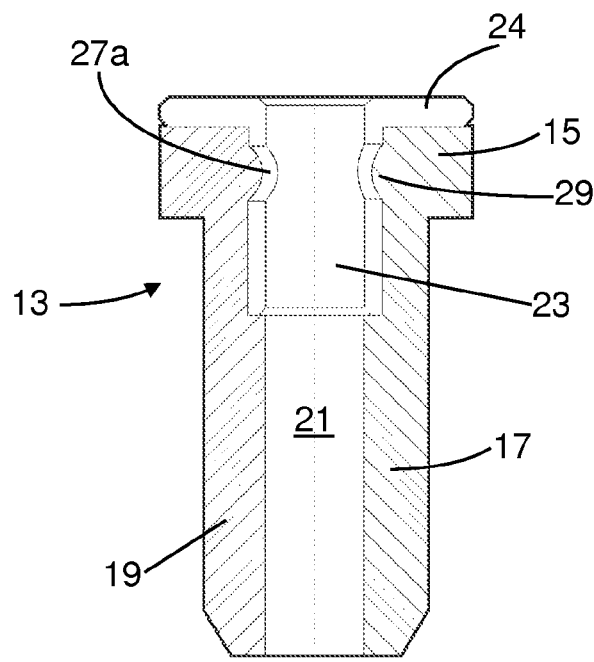
FIG. 4 is a cross-sectional view of a wire mesh rivet wherein the rivet includes a metal insert in the form of a grommet and the grommet includes apertures which engage the rivet's wire mesh structure. As shown in this figure, the apertures extend through the entire thickness of the wall of the insert.
Figure 5:
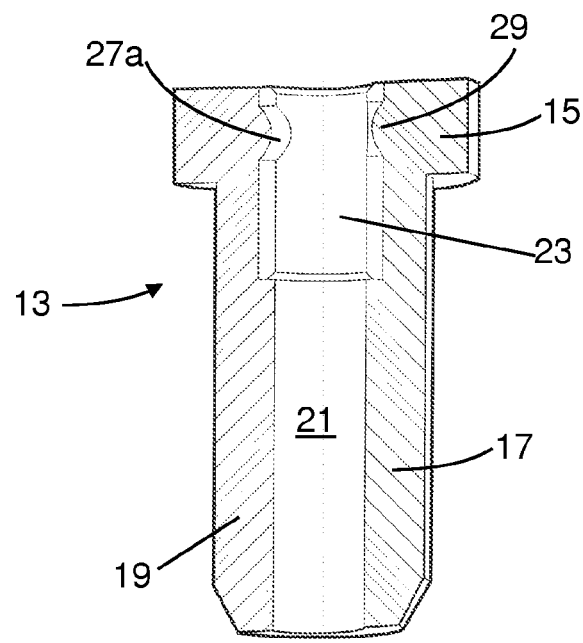
FIG. 5 is a cross-sectional view of a wire mesh rivet wherein the rivet includes a metal insert in the form of a sleeve and the sleeve includes apertures which engage the rivet's wire mesh structure. As shown in this figure, the apertures extend through the entire thickness of the wall of the insert.
Figure 6:
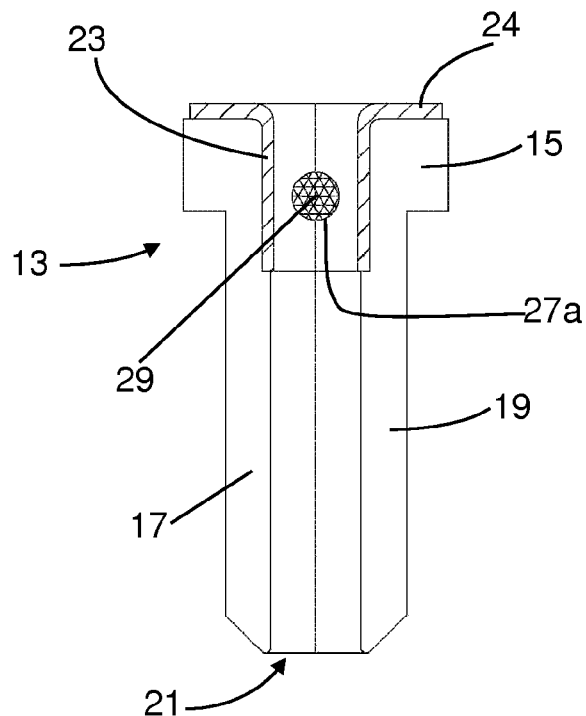
FIG. 6 is a cross-sectional view of a wire mesh rivet wherein the rivet includes a metal insert that includes apertures which extend through the entire thickness of the wall of the insert. The figure illustrates the engagement of wire mesh with an aperture.
Figure 7A:
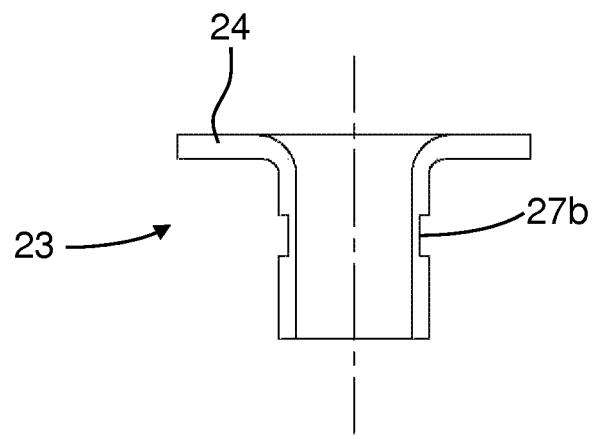
FIGS. 7A and 7B are cross-sectional and top view views, respectively, of a metal insert in the form of a grommet which includes apertures which extend partially through the thickness of the wall of the insert.
Figure 7B:
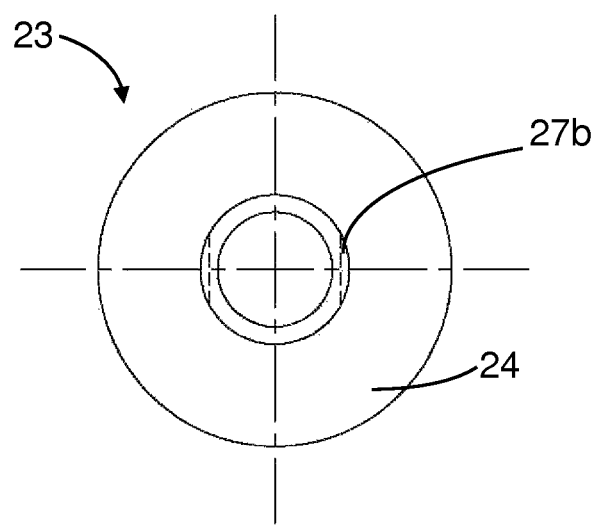

The apertures can extend completely through the wall of the metal insert as shown by reference number 27a in FIGS. 4-6 or only partially through the wall as shown by reference number 27b in FIG. 7. The apertures that extend completely through the wall can be produced by piercing the wall, while the apertures that extend partially through the wall can be produced by broaching.

Broaching is generally less expensive than piercing. Also, because the broached apertures only extend partially through the insert's wall, the wall retains more of its original column strength which, as discussed above, is important in terms of withstanding the compressive forces applied to the insert during fastening of a heat shield to its supporting structure. For both these reasons, apertures that extend only partially through the wall of the insert are generally preferred.

The average wire mesh density of the mesh rivet's collar is greater than the average wire mesh density of its shank. In particular, the average density of the collar is substantially equal to the average density of the finished isolator, while the average density of the shank is substantially less than the finished density. In this way, after being inserted in the bore of a substrate (e.g., a bore in a heat shield), the shank can be compressed to form a second collar which has the density of the finished isolator (see below).

Quantitatively, the ratio of the average density of the rivet's shank to the average density of the rivet's collar is in the range of 1:2 to 1:3, preferably in the range of 1:2 to 1:2.5, and most preferably, approximately 1:2. The density of the collar will depend on the particular application, but generally, when expressed in percent, the average density of the rivet's collar is in the range of 15% to 25%. Accordingly, the density of the shank will generally be in the range of 7.5% to 12.5%. Preferred collar and shank densities are approximately 20% for the collar and approximately 10% for the shank.

As known in the art, the average density (D) in percent of a wire mesh part can be calculated by: (1) determining the weight (W) of the part, (2) determining the volume (V) of the part, (3) determining the density (p) of the wire making up the wire mesh, and (4) calculating the average density from the equation: $D=100*(W/(V*p))$.

Figure 17:
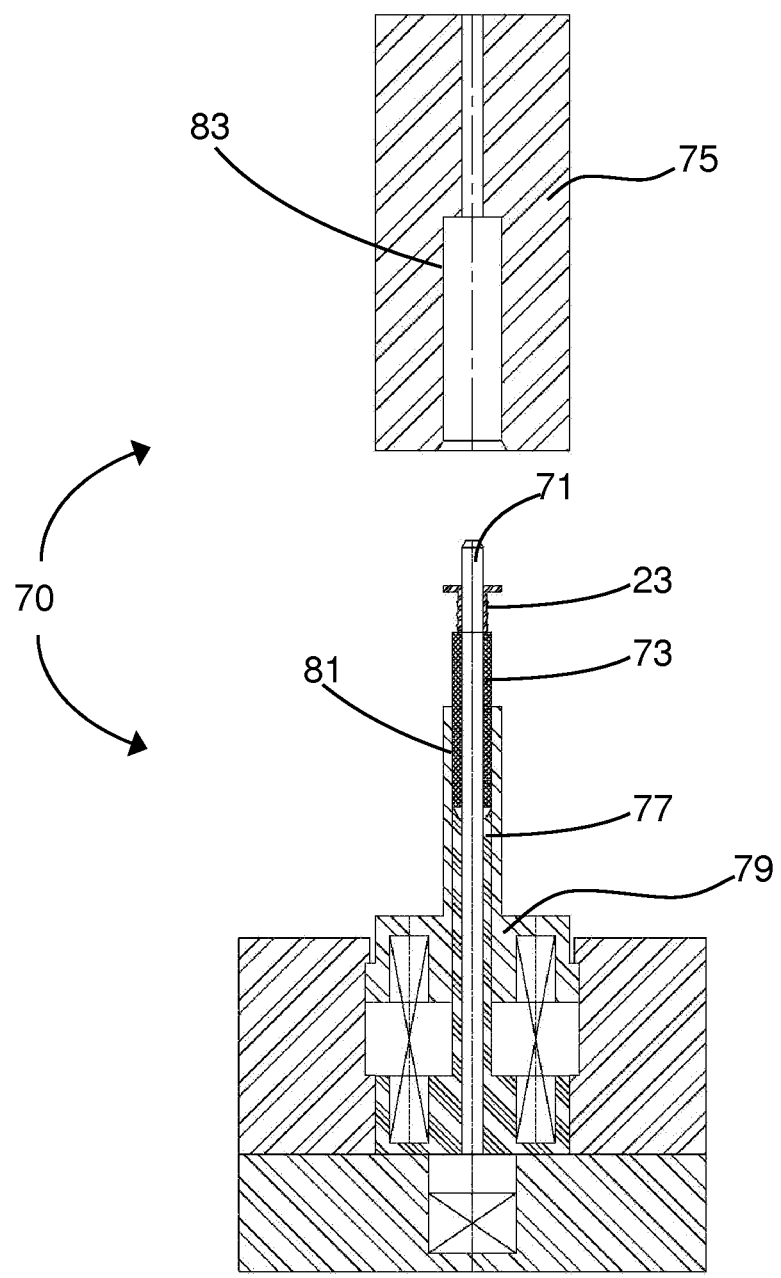
FIG. 17 is a cross-sectional view showing a tool for forming a wire mesh tube into a wire mesh rivet. The tool is in its open position in this figure.
Figures 18A, 18B:
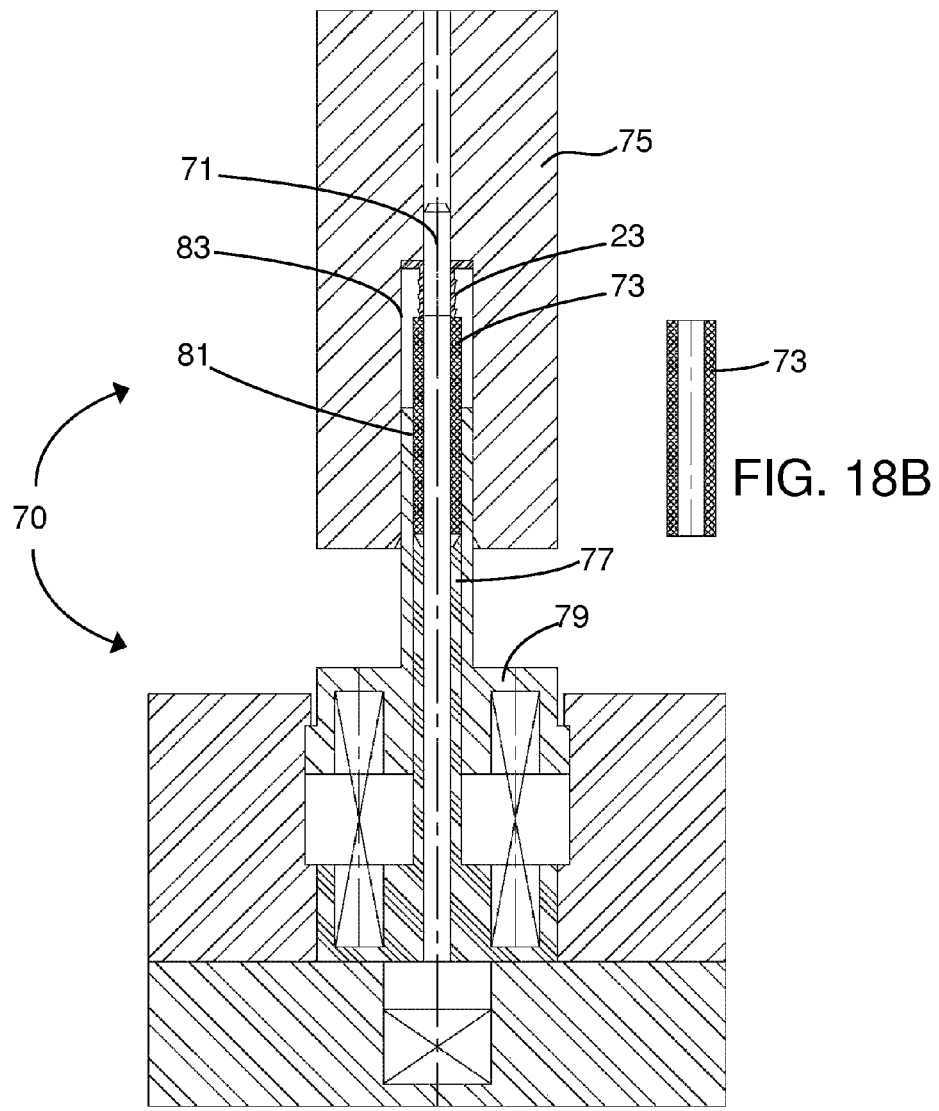
FIG. 18A is a cross-sectional view showing the tool of FIG. 17 in its initial closed position.
FIG. 18B is a cross-sectional view showing the configuration of the wire mesh tube at this point in the process.

The difference in density between the rivet's collar and shank can be achieved using tooling of the type shown in FIGS. 17-20. FIG. 17 shows tool 70 in its open condition with a rolled mesh tube 73 placed over an arbor 71 and, in this case, a barbed metal insert 23 placed on top of the mesh tube on the same arbor. FIG. 18A shows an upper forming sleeve 75 coming down over arbor 71 and preparing to (a) drive the metal insert 23 into the mesh tube and (b) form the collar 15 of the wire mesh rivet 13. In this and subsequent steps, the mesh tube is supported on the bottom by stationary member 77. FIG. 18-B shows the shape of the wire mesh tube at this point in the process.

Figure 19A:
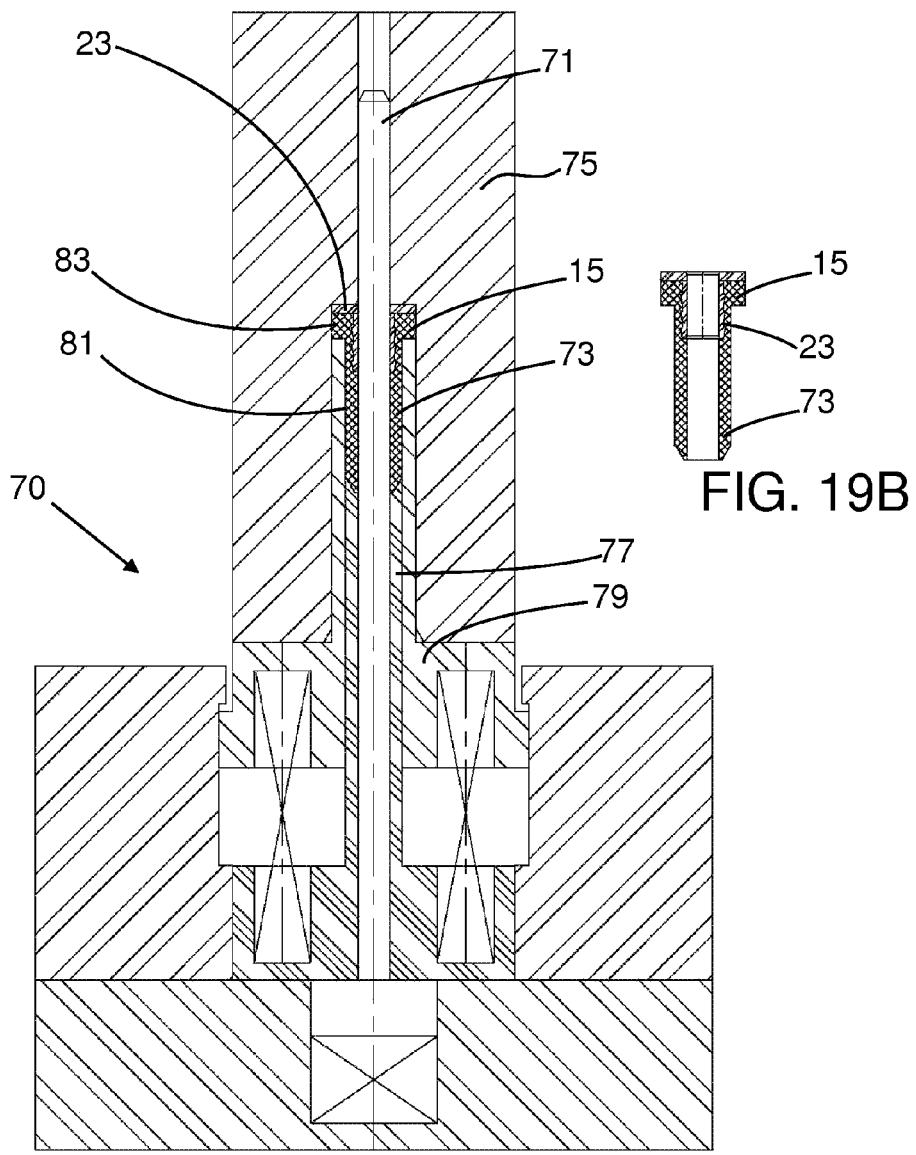
FIG. 19A is a cross-sectional view showing the configuration of the tool of FIG. 17 at the point where the rivet's collar has been formed.

FIG. 19A shows the upper forming sleeve 75 forming and compressing collar 15 from the upper portion of the mesh tube. What happens here that needs to be understood is that as the upper forming sleeve is coming down it bulges the mesh out just above spring-loaded sleeve 79. In particular, the shoulder at the top of spring-loaded sleeve 79 prevents the mesh tube from traveling downward. The more the upper sleeve goes down the more the mesh encroaches over the spring-loaded sleeve further preventing the mesh tube and, in particular the mesh shank, from traveling axially. As a result of this process, the densities of both the collar and the shank are increased, with the density of the collar being increased much more than the density of the shank. FIG. 19B shows the resulting structure.

Figures 20A, 20B:
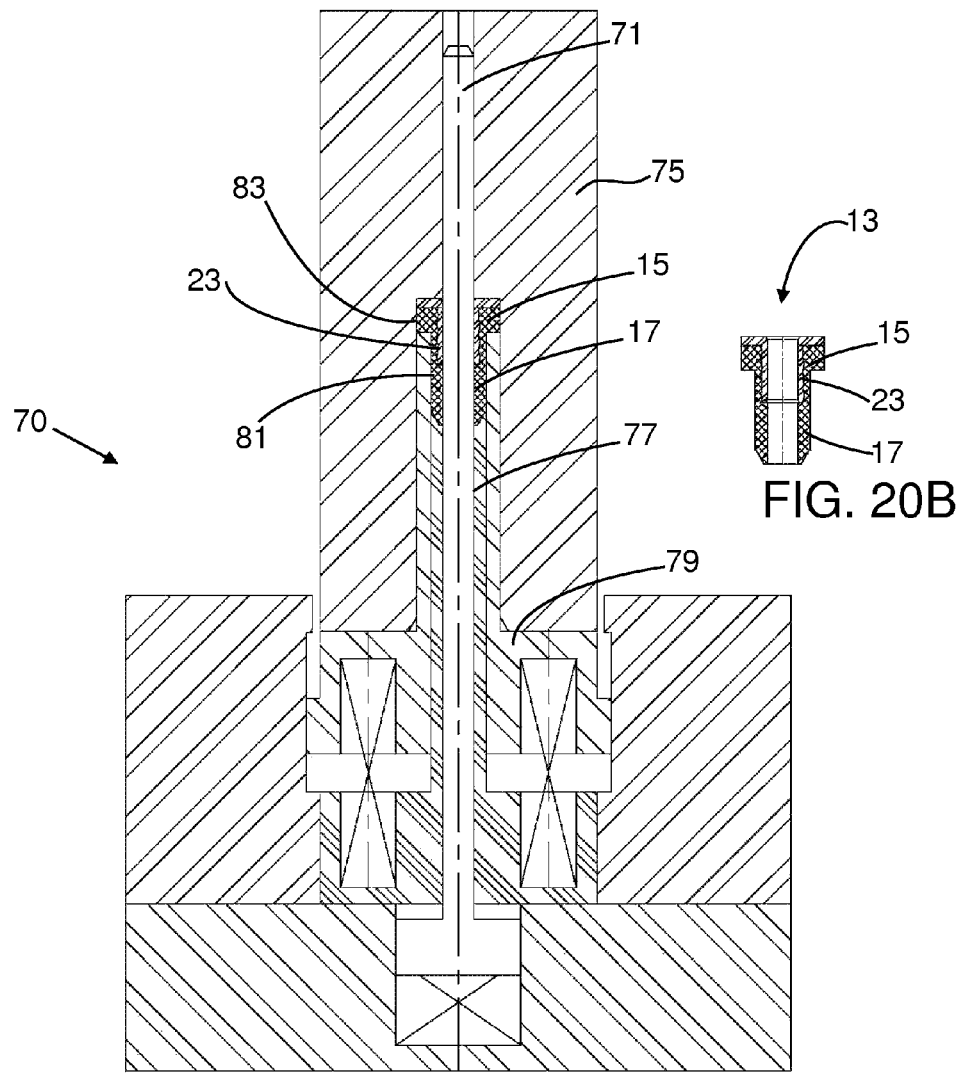
FIG. 20A is a cross-sectional view showing the configuration of the tool of FIG. 17 at the point where both the rivet's collar and its shank have been formed.
FIG. 20B is a cross-sectional view showing the configuration of the wire mesh tube at this point in the process, i.e., it shows the completed wire mesh rivet.

FIG. 20A shows the upper sleeve continuing even further downward, but in this case it has overcome the springs (not shown) of spring-loaded sleeve 79. As a result, the shank portion of the tube is further compressed to its final density. FIG. 20B shows the resulting finished wire mesh rivet 13 with the rivet's collar 15 having a higher density than its shank 17.

It should be noted that when a metal insert having an aperture 27a which extends completely through the insert's wall is used, arbor 71 prevents the mesh from flowing into the bore of the rivet as collar 15 is formed. That is, the wire mesh enters the aperture, but is stopped from entering the rivet's bore by the arbor. Wire mesh also enters apertures 27b as the collar is formed in cases where apertures which extend only partially through the thickness of the wall of the metal insert are used.

The wire mesh making up the wire mesh structure can be composed of various materials and those materials can be subjected to various treatments (including coatings) either before or after being formed into a mesh. Examples of suitable materials and treatments include, without limitation, carbon steel, stainless steel, 300 and 400 series, tin-plated carbon steel, zinc-plated carbon steel, and galvanized carbon steel. The wires making up the wire mesh can have various cross-sections, including, without limitation, round, hexagon, octagon, square, and flat. The wire mesh is preferably a knitted wire mesh, although other types of wire meshes, e.g., woven and expanded metal meshes, can be used if desired.

Figure 8:
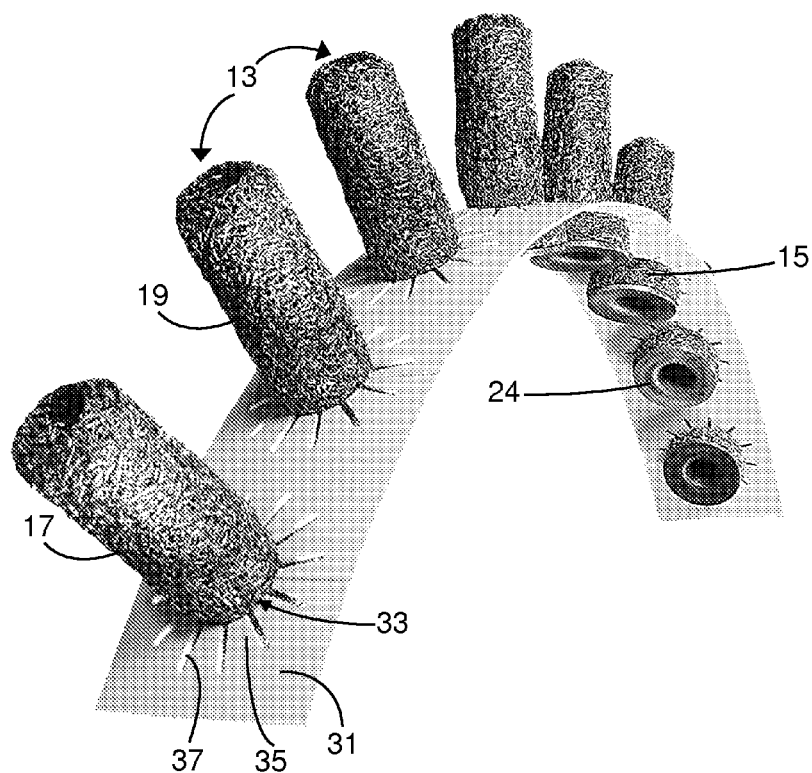
FIG. 8 is a perspective view of a dispensing strip carrying wire mesh rivets.
Figure 9:
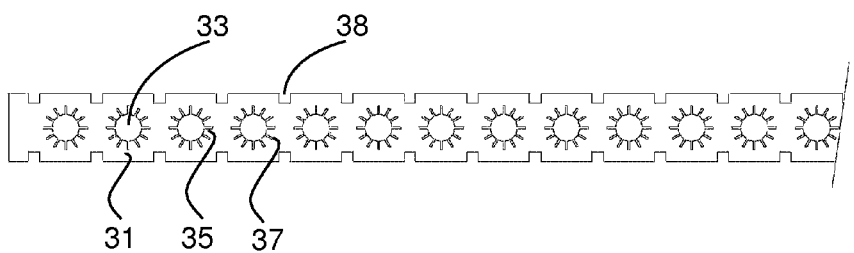
FIG. 9 is a top view of the dispensing strip of FIG. 8 showing the flexible fingers used to engage the shanks of the mesh rivets.

The wire mesh rivets are preferably mounted in a dispensing strip prior to being provided to users, e.g., heat shield manufacturers. FIGS. 8 and 9 show a suitable configuration for such a dispensing strip. As can be seen in these figures, dispensing strip 31 includes a plurality of apertures 33 sized to receive the shanks 17 of rivets 13 and to allow collars 15 to be pushed through the apertures. Apertures 33 comprise a plurality of flexible fingers 35 formed by slits 37 in the body of the strip. As can be seen in FIG. 9, dispensing strip 31 can include notches 38 for use in feeding the strip to isolator forming equipment, e.g., equipment 39 of FIGS. 10 and 11 discussed below.

As discussed below, the dispensing strip facilitates automation of the process which converts wire mesh rivets into wire mesh isolators. As such, the dispensing strip needs to satisfy a number of competing criteria. First, the strip needs to hold the rivets sufficiently securely so that the rivets do not become misaligned or dislodged from the strip during transport and handling. Typically, the strip will be coiled in a shipping container and dispensed directly from the container. Accordingly, the strip is preferably flexible enough to be wrapped into a coil while still minimizing misalignment and dislodgement of the rivets when coiled. Second, the rivets must be readily dispensable from the strip. In particular, the strap must have sufficient strength so that it does not buckle under the forces applied to the rivet during dispensing. Such buckling is undesirable since it can cause the strip to partially or completely lose engagement with the strip's feed mechanism. Third, the strips must be inexpensive so that they can be a disposable item.

In practice, it has been found that the number and length-to-width ratio of flexible fingers 35 are important parameters in meeting these criteria for a strip composed of a low cost plastic material, such as plasticized styrene. Thus, less than 3 flexible fingers results in unacceptably high dispensing forces, as does a length-to-width ratio of less than 1:1. On the other hand, more than 16 flexible fingers results in unacceptable levels of dislodgement of the rivets from the strip, as does a length-to-width ratio greater than 3:1.

Accordingly, the number of fingers 35 per aperture is preferably in the range of 3-16. As to the length-to-width ratio of the individual fingers, this parameter is preferably in the range of 1:1 to 3:1, e.g., 1.6:1. These ranges have been found to work successfully with wire mesh rivets having dimensions suitable for use in producing wire mesh isolators for vehicle heat shields, e.g., with wire mesh rivets having shank and collar OD dimensions of approximately 14 millimeters and 22 millimeters, respectively.

Turning now to the process for producing wire mesh isolators from the wire mesh rivets., in broad outline, a wire mesh rivet 13 is transformed into a wire mesh isolator 11 by inserting the rivet's shank 17 in a bore in a substrate 65 (e.g., a bore 9 in a heat shield) with collar 15 engaging one side of the substrate (the proximal side of the substrate) and then compressing the portion of the shank which extends beyond the distal side of the substrate into a second collar 63 (see FIG. 16). Preferably, the proximal and distal collars 15 and 63 of the finished isolator 11 have substantially equal densities since unequal densities can cause the isolator to have compromised thermal and/or vibrational properties. The proximal and distal collars also will generally have substantially equal diameters and thicknesses, although they can be unequal if desired (see, for example, the collars of FIG. 16).

In U.S. Patent Publication No. 2006/0219860 referred to above, the proximal and distal collars are formed simultaneously which requires similar forming equipment on both sides of the substrate. For some heat shield configurations (see FIG. 1), locating the forming equipment on the concave side of the heat shield is challenging because of the limited space available. The use of wire mesh rivets having a preformed collar eliminates this problem because compared to forming equipment, less bulky equipment is needed to locate the rivet in the bore and hold it in place while the collar on the opposite side of the substrate is being for med.

Figure 10:
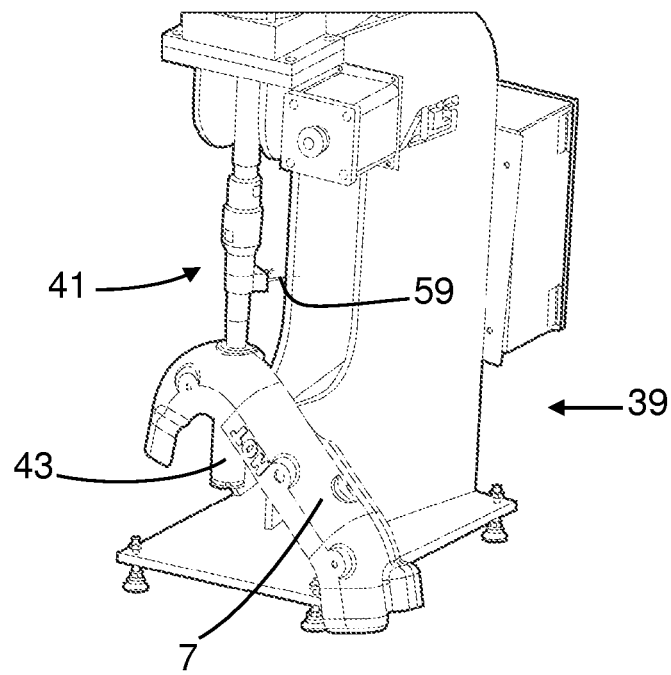
FIG. 10 is a perspective view illustrating equipment for forming a wire mesh isolator from a wire mesh rivet at a bore of heat shield.
Figure 11:
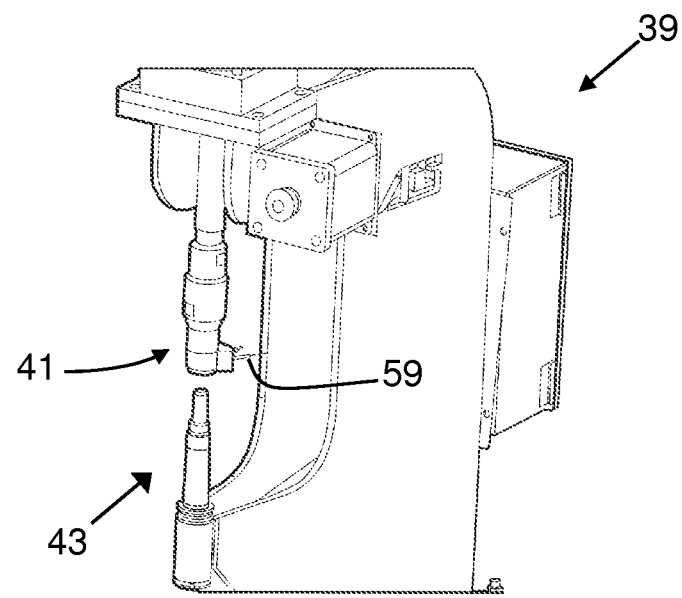
FIG. 11 is a perspective view of a portion of the isolator forming equipment of FIG. 10 with various parts removed to highlight features of the equipment's lower positioning assembly.

FIGS. 10 and 11 show representative isolator forming equipment 39 which takes advantage of this aspect of the invention. The equipment includes an upper forming assembly 41 and a lower positioning assembly 43. It should be noted that the reference to the "upper" forming assembly and the "lower" positioning assembly are only for convenience of description, it being understood that the positioning assembly and the forming assembly can be reversed or can be oriented at an angle other than vertical, e.g., horizontally, if desired.

FIG. 10 shows the equipment 39 in use while FIG. 11 shows the same equipment with heat shield 7 removed as well as much of the upper forming assembly 41. The limited amount of equipment needed for the lower positioning assembly 43 is evident in FIG. 11.

Figure 12:
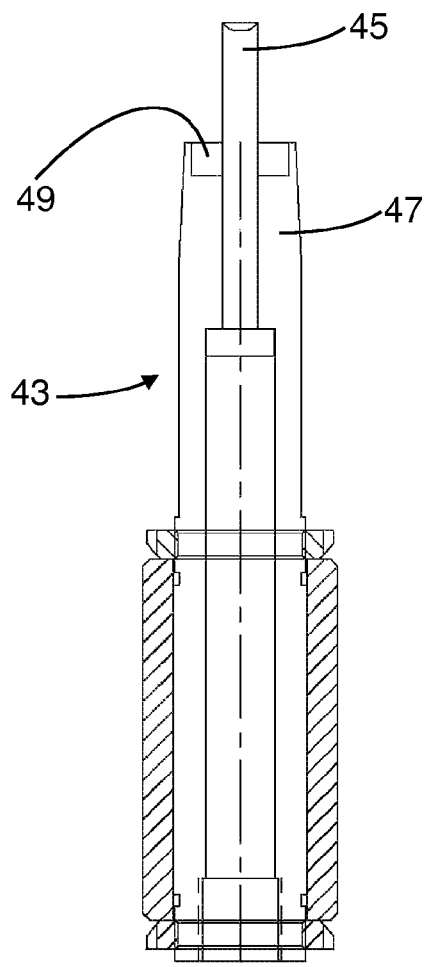
FIG. 12 is a side view, partially in section, of a portion of the lower positioning assembly of the isolator forming equipment of FIG. 10.

FIG. 12 shows the lower positioning assembly 43 in more detail. As can be seen in this figure, the assembly comprises two main parts—a mandrel 45 which engages the bore 21 of the rivet's wire mesh structure 19 and a sleeve 47 which includes a recess 49 which receives the rivet's preformed collar 15 and maintains the collar's shape as the wire mesh collar on the opposite side of the substrate is formed. By minimizing the difference between the outside diameter (OD) of sleeve 47 at the level of the recess and the outside diameter of preformed collar 15, the lower positioning assembly's footprint as seen from the substrate is not much larger than the footprint of the wire mesh rivet itself. In practice, the OD of sleeve 47 can be held to be within 110% of the OD of the rivet's collar, i.e., $OD_{sleeve}/OD_{collar} \leq 1.1$. Such a small footprint for the lower positioning assembly greatly facilitates the formation of wire mesh isolators for substrates having curved surfaces, such as various of the heat shields of FIG. 1.

Figure 13:
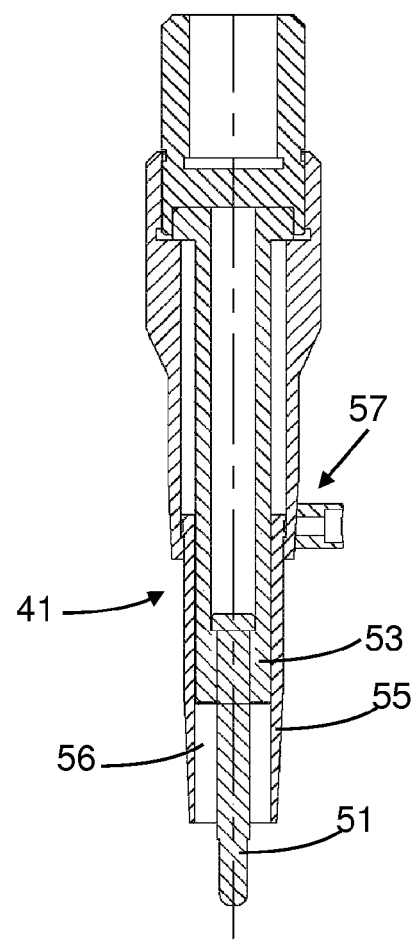
FIG. 13 is a cross-sectional view of a portion of the upper forming assembly of the isolator forming equipment of FIG. 10.

FIG. 13 shows the upper forming assembly 41 in more detail. This assembly includes a mandrel 51 which engages the bore 21 of the rivet's wire mesh structure 19 and a tamp 53 which, during use of the assembly, moves downward to the position shown in FIG. 13 to compress the wire mesh of shank 17 within the confines of sleeve 55, i.e., within the cavity 56 formed by the inner wall of sleeve 55, to form the second collar of the isolator, i.e., the collar on the upper side of the heat shield in FIG. 10. During the formation of the second collar, mandrels 45 and 51 of the lower positioning assembly and the upper forming assembly maintain an open bore along the entire length of the rivet and, as it is formed, the finished isolator. As discussed above, recess 49 in sleeve 47 of positioning assembly 43 constrains collar 115 from changing its shape as forming assembly 41 forms the second collar. As a result of these constraints applied by the mandrels and this recess, finished wire mesh isolators are produced which have well defined OD and ID dimensions and collars with substantially equal wire mesh densities.

As shown in FIG. 13, forming assembly 41 preferably includes a sensor 57, e.g., a proximity switch, for detecting the position of sleeve 55. The sensor is connected to a control system (not shown) by wires 59 (see FIGS. 10 and 11). The control system allows mandrel 51 and tamp 53 to move towards the substrate only if the sensor indicates that sleeve 55 is in its most forward position, i.e., the control system only allows the mandrel and tamp to move forward if sleeve 55 is in engagement with the surface of the substrate, thus preventing an operator's hands from coming into contact with the mandrel and tamp. Sleeve 55 is itself lightly sprung so that its motion does not present a hazard to personnel operating the forming equipment. In particular, the force applied by the sleeve to the substrate is less than 10 pounds. In this way, the forming equipment avoids injury to operating personnel without the need for a light curtain or similar device to ensure that the equipment is not operated while the operator's hands are close to the equipment. If desired, more than one sensor for the position of sleeve 55 can be employed to provide redundant protection.

Figure 14:
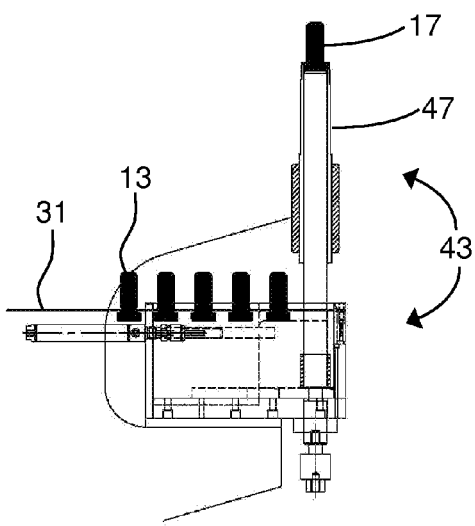
FIG. 14 is a side view illustrating the use of a dispensing strip to provide wire mesh rivets to the isolator forming equipment of FIG. 10. Various parts have been removed for clarity.

Although not shown in FIGS. 10 and 11, a dispensing strip 31 is preferably employed to supply wire mesh rivets to isolator forming equipment 39. FIG. 14 shows such an embodiment. In particular, this figure shows positioning assembly 43 after it has removed a mesh rivet 13 from strip 31 and has moved it upward to enter the bore of a substrate (not shown). Forming assembly 41 (not shown in this figure) would then compress the shank 17 of the rivet to form second collar 63 of the finished isolator 11.

Figure 15:
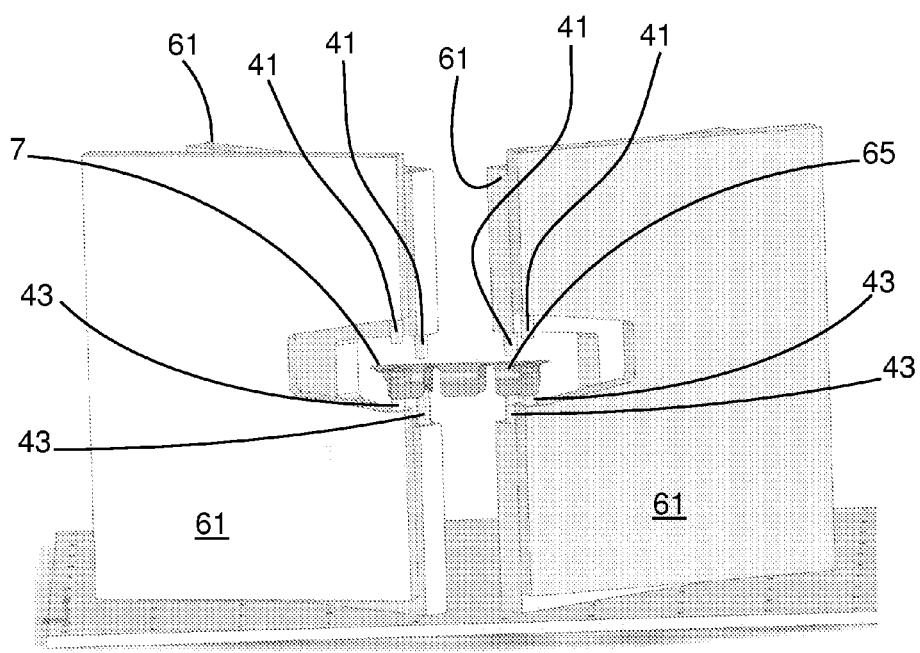
FIG. 15 is a perspective view showing the formation of multiple isolators in a heat shield without the need to reposition the part.

FIG. 15 shows an embodiment in which multiple isolators are formed at different locations of a single substrate (e.g., a single heat shield) without the need to reposition the part. As can be seen in this figure, supporting structures 61 hold a plurality of upper forming assemblies 41 and lower positioning assemblies 43 in place relative to heat shield 7 so that isolators can be formed at each of the shield's bores. Preferably, the isolators are formed simultaneously, although sequential formation (e.g., singly or in groups) can be employed if desired. Although not shown in this figure, dispensing strips 31 are preferably used to provide wire mesh rivets to each of the lower positioning assemblies.

A variety of modifications that do not depart from the scope and spirit of the invention will be evident to persons of ordinary skill in the art from the foregoing disclosure. For example, although the invention has been illustrated in terms of heat shields employed in vehicle exhaust systems, it can be used in a variety of other applications where thermal and/or acoustical isolation is desired. Similarly, the invention is not limited to the particular types of heat shields illustrated herein but can be used with other heat shields now known or subsequently developed. Also, the invention can be used with single layer metal substrates or more complex substrates having multiple metal layers or a combination of metal and non-metallic layers, e.g., layers of ceramic or glass fibers. The following claims are intended to cover these and other modifications, variations, and equivalents of the embodiments disclosed herein.

What is claimed is:

1. A dispenser for wire mesh preforms for use in forming wire mesh isolators, said dispenser comprising:
   (I) a flexible strip having a plurality of apertures, and
   (II) at least one wire mesh preform in one of the apertures, wherein:
   (a) the at least one wire mesh preform comprises a collar and a shank in a configuration of an unused rivet,
   (b) the apertures are sized to retain the shank and to allow the collar to be pushed through the aperture,
   (c) each aperture comprises a plurality of circumferential flexible fingers formed by slits in the flexible strip, and
   (d) the at least one wire mesh preform comprises:
      (i) a unitary wire mesh structure which has a central bore and comprises the preform's collar and the preform's shank; and
      (ii) a metal insert at least a part of which is within the central bore, the metal insert comprising a wall which has an exterior surface and the exterior surface comprising at least two apertures for engaging the wire mesh of the central bore of the unitary wire mesh structure.

2. The dispenser of claim 1 wherein the ratio of the average density of the preform's shank to the average density of the preform's collar is in the range of 1:2 to 1:3.

3. The dispenser of claim 2 wherein the average density of the preform's collar is in the range of 15% to 25%.

4. The dispenser of claim 1 wherein the at least two apertures are substantially completely filled with the wire mesh of the unitary wire mesh structure.

5. The dispenser of claim 1 wherein the at least two apertures extend partially through the thickness of the wall.

6. The dispenser of claim 5 wherein the apertures are formed by broaching.

7. The dispenser of claim 1 wherein the at least two apertures extend completely through the thickness of the wall.

8. The dispenser of claim 7 wherein the apertures are formed by piercing.

9. The dispenser of claim 1 wherein:
   (a) the number of flexible fingers per aperture is between 3 and 16; and
   (b) the length-to-width ratio of each flexible finger is in the range of 1:1 to 3:1.

10. The dispenser of claim 1 comprising a wire mesh preform in each of the apertures.

* * * * *